United States Patent
Siedhoff

(10) Patent No.: US 8,663,585 B1
(45) Date of Patent: Mar. 4, 2014

(54) SYSTEM, METHOD, AND COMPOSITION FOR FLUE GAS DESULFURIZATION (FGD) PURGE WATER DISPOSAL

(71) Applicant: Mississippi Lime Company, St. Louis, MO (US)

(72) Inventor: Thomas E. Siedhoff, St. Louis, MO (US)

(73) Assignee: Mississippi Lime Company, St. Louis, MO (US)

( * ) Notice: Subject to any disclaimer, the term of this patent is extended or adjusted under 35 U.S.C. 154(b) by 0 days.

(21) Appl. No.: 13/795,391

(22) Filed: Mar. 12, 2013

Related U.S. Application Data

(60) Provisional application No. 61/609,600, filed on Mar. 12, 2012.

(51) Int. Cl.
*B01D 53/34* (2006.01)
*B01D 53/50* (2006.01)
*C04B 18/06* (2006.01)

(52) U.S. Cl.
USPC ............... 423/210; 423/240 R; 423/243.08; 588/252; 588/256; 588/257; 588/404; 106/710

(58) Field of Classification Search
USPC ............... 588/252, 256, 257, 404; 106/710; 423/210, 240 R, 243.08
See application file for complete search history.

(56) References Cited

U.S. PATENT DOCUMENTS

| | | | | |
|---|---|---|---|---|
| 3,785,840 A | * | 1/1974 | Minnick et al. | 106/710 |
| 4,304,674 A | * | 12/1981 | Lazovsky et al. | 588/257 |
| 4,397,801 A | * | 8/1983 | Minnick | 264/140 |
| 5,211,750 A | * | 5/1993 | Smith et al. | 106/710 |
| 5,322,389 A | * | 6/1994 | Smith | 405/129.3 |
| 5,358,760 A | * | 10/1994 | Furlong et al. | 428/70 |
| 5,387,739 A | * | 2/1995 | Pichat | 588/257 |
| 5,542,977 A | * | 8/1996 | Hanst | 106/706 |
| 8,389,439 B2 | * | 3/2013 | Utter | 502/439 |

FOREIGN PATENT DOCUMENTS

| | | | | |
|---|---|---|---|---|
| DE | 38 28 844 A1 | * | 11/1989 | A62D 3/00 |
| JP | 2001-9418 A | * | 1/2001 | B09B 3/00 |

* cited by examiner

*Primary Examiner* — Timothy Vanoy
(74) *Attorney, Agent, or Firm* — Lewis, Rice & Fingersh, L.C.

(57) ABSTRACT

A system, method, and composition for generating a composition made from a combination of fly ash, FGD purge water, a fixation agent such as lime, and/or synthetic gypsum which, when mixed in the right proportions, results in a material that is easily handled and sets up over time in a relatively impermeable manner that significantly reduces the leaching of contaminants that would otherwise be readily available for release into the environment.

5 Claims, 1 Drawing Sheet

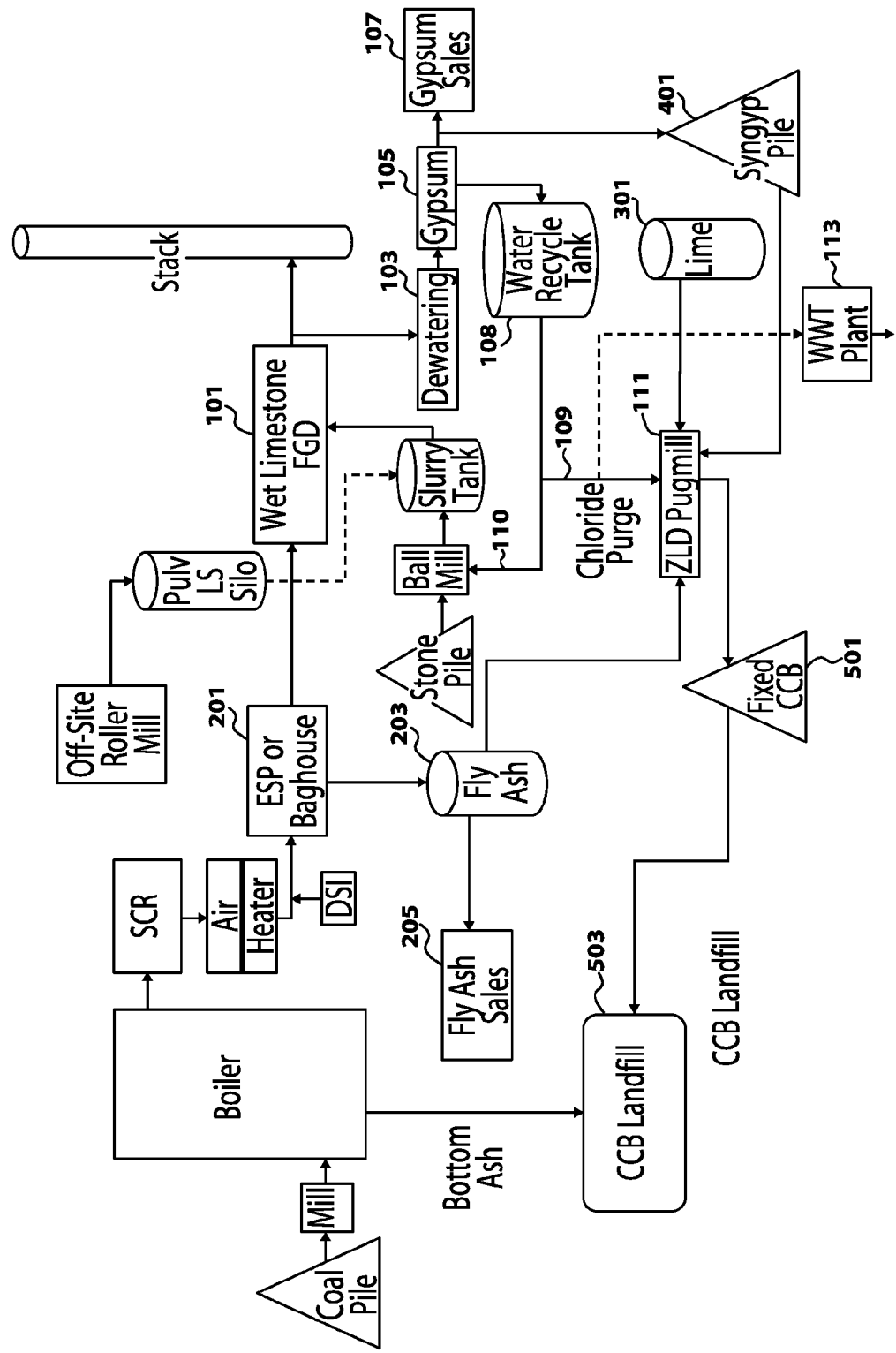

SYSTEM, METHOD, AND COMPOSITION FOR FLUE GAS DESULFURIZATION (FGD) PURGE WATER DISPOSAL

CROSS REFERENCE TO RELATED APPLICATION(S)

This application claims the benefit of U.S. Provisional Patent Application Ser. No. 61/609,600, filed Mar. 12, 2012, the entire disclosure of which is incorporated herein by reference.

BACKGROUND

1. Field of the Invention

This disclosure is related to the field of the disposition of by-products from wet limestone or lime Flue Gas Desulfurization (FGD), and specifically to the encapsulation of FGD purge water in combination with other coal-fired plant by-products and a fixation agent as part of a low permeability by-product with reduced leachability of pollutants of concern.

2. Description of Related Art

Coal is one of the most common sources of fuel in the electric generation industry and in other industries that rely on a source of heat in order to power the machines of industry. Coal has been a common fuel since the industrial revolution and is not about to be replaced in the near term future. While coal-fired plants are common, there have recently arisen concerns as to the by-products produced from combustion processes generally, and specifically burning coal.

One major issue with the by-products of coal combustion is inhibiting the release of sulfur dioxide ($SO_2$). Emission standards from a wide variety of United States Environmental Protection Agency (US EPA) driven regulatory requirements under the Clean Air Act have required a large number of coal-fired plants to retrofit and install "scrubbers" to capture sulfur dioxide from their flue gas. This process is called Flue Gas Desulfurization (FGD). One common technology for FGD is wet Lime or Limestone scrubbers where the calcium source (lime or limestone) is mixed in a slurry and introduced to the gas stream in a large reactor to "scrub" the $SO_2$ from the gas stream. Most coals burned in these plants contain small concentrations of chlorine. The chlorine is readily scrubbed from the gas within the FGD system. As the calcium slurry is recirculated in the scrubber, these chlorine compounds that have been removed ("chlorides") accumulate and, if not controlled, will concentrate in the slurry. As chloride concentrations rise, they begin to cause operational issues with the FGD system due to their corrosive nature which increases with concentration. If left uncontrolled, these chlorides can attack even the most exotic and expensive metal alloys causing major damage to an FGD system. In order to control this chloride corrosion phenomenon, it is common practice to control the level of chlorides present in the scrubber slurry by removing or "purging" a portion of the scrubber slurry. This process is often referred to as a "chloride purge".

The FGD purge stream is an aqueous solution and generally contains a wide variety of pollutants. It, includes gypsum, along with heavy metals, chlorides, magnesium and dissolved organics. In many applications, FGD purge water is first treated by dewatering to separate synthetic gypsum cake which can be a valuable secondary product. The remaining FGD purge water is then recycled back to the scrubber. A portion of this water (still containing dissolved chlorides) is removed from the recycle stream (the "chloride purge"), and is subjected to various forms of water treatment (as required) to reduce or eliminate dissolved metals and other contaminants of concern prior to discharge back into the environment in accordance with the applicable permits and laws.

Fly ash is also a common by-product of coal-fired plants, although it is produced in most other forms of combustion as well. Fly ash is entrained as a component of flue gas and is generally captured by electrostatic precipitators, baghouses, or other particle filtration equipment prior to flue gas exiting the stack. Fly ash also commonly includes elevated concentrations of heavy metals as well as silicas and alumina compounds. Once captured, fly ash is also generally ponded or landfilled to allow settling and containment of the fly ash.

Using current wastewater treatment technologies does not remove all the contaminants of potential concern. Some contaminants, such as selenium, are very difficult to remove. US EPA has indicated an intent to further regulate this discharge in order to address some of these concerns. Treatment systems to deal with these new concerns will be very expensive both in their capital cost and often in their operating costs.

SUMMARY

Because of these and other problems in the art, described herein is a system, method, and composition for generating a composition made from a combination of fly ash and/or synthetic gypsum, FGD purge water, and a fixation agent which when mixed in the right proportions results in a material that is easily handled and sets up over time into a relatively impermeable manner that significantly reduces the leaching of the contaminants of concern that would otherwise be readily available for release into the environment. The resultant material chemically binds and encapsulates the contaminants present in all the material streams (fly ash and/or gypsum and FGD purge water), particularly heavy metals and dissolved materials, in a form which can be safely managed in an appropriate manner such as placement in a landfill. In an alternative embodiment, the waste material can form a useful secondary product, such as a construction material.

There is described herein, among other things, a composition of matter comprising: purge water comprising: water remaining from the removal of gypsum from a flue gas desulfurization blowdown; fly ash; and lime; wherein the combination forms a low strength cement of soil-like consistency.

In an embodiment, the composition further comprises gypsum.

In an embodiment of the composition, the lime comprises about 1% to about 5% of the composition by mass; the fly ash comprises about 40% to about 80% of the composition by mass; the purge water comprises about 15% to about 25% of the composition by mass; and the gypsum comprises less than 40% of the composition by mass.

There is also described herein, a method for capturing pollutants from the combustion of coal in a solid non-leachable form, the method comprising: using a calcium slurry to perform flue gas desulfurization (FGD) on flue gas created from the combustion of coal; performing a chloride purge on the calcium slurry to create an FGD purge stream; dewatering the FGD purge stream to remove gypsum and create a purge water; mixing the purge water with fly ash and lime to create a low strength cement; allowing the low strength cement to harden; and landfilling the low-strength cement.

In an embodiment of the method, the step of mixing also includes adding gypsum to the purge water, fly ash, and lime.

In an embodiment of the method, the gypsum added to the water, fly ash, and lime comprises a portion of the gypsum removed in the dewatering.

BRIEF DESCRIPTION OF THE DRAWINGS

FIG. 1 shows a functional block diagram of an embodiment of a coal fired boiler including a wet limestone flue gas desulfurization (FGD) system and a system for utilizing an embodiment of the FGD Purge water disposal method.

DESCRIPTION OF THE PREFERRED EMBODIMENTS

This disclosure is intended to teach by way of example and not by way of limitation.

Some users have attempted to combine excess chloride residuals with synthetic gypsum in a wet disposal method known as a "wet stack" to form a stabilized sludge. However, these sludges are generally very high in dissolved solids which have not been chemically bound to the gypsum and which are readily subject to leaching by exposure to water. As such, the compositions are not suitable for landfilling where exposure to rain and other surface water can result in contamination of neighboring water sources and land.

Proposed herein is a system wherein an FGD blowdown is dewatered to remove gypsum which may be sold. A portion of the remaining water is them purged. This resultant wastewater stream is mixed with fly ash, and possibly gypsum, and a fixation agent in order to form a low strength cement that, when fully reacted forms a low leachable, low-permeability by-product. The by-product may then be landfilled, or may be suitable for certain types of other use, including certain construction projects.

In an alternative embodiment, on those occasions where there is insufficient ash and/or gypsum to adequately absorb the initial volume of chloride purge water, the excess portion of this water is stored in a tank and pumped through a piping system to an injection manifold located in the post combustion ductwork of the power plant boiler. This relatively small volume of wastewater is atomized and spayed into the duct where the water is evaporated by the hot gas and the residual contaminant remain as fine solids carried in the gas stream. These solids may be removed along with the fly ash, collected, and then reincorporated with the by-product materials prior to final disposition.

FIG. 1 provides a general block diagram of a coal-fired power plant, including a system for carrying out a method of FGD purge water disposal. The FGD blowdown will exit the bottom of the scrubber reactor vessel (101) and is pumped to a vacuum filter or other filtration system where it is dewatered (103) in any manner known to those of ordinary skill in order to capture gypsum (105) which is then sold or handled in some other appropriate manner (107). The water (108) that has been removed from the gypsum (105) is returned to the scrubber (110) or otherwise managed in an appropriate manner. However, a portion (109) of that returning water is removed in order to control the chloride concentration. The chloride purge water (109) stream including contaminants, is pumped so as to be fed into a mixing device such as a pug mill (111).

Meanwhile, captured fly ash (203) from the filtration equipment (201) is also provided to the mixing device (111). A fixation agent, such as lime (301), is also provided to the mixing device (111).

In an embodiment, gypsum (401) retained from the dewatering (103) can also be provided to the mixing device (111). As essentially all of captured gypsum solids are potentially saleable and generally contain significantly less leachable contaminants than the other components (fly ash and chloride purge), it is generally preferred that as little gypsum (401) as possible be used. While fly ash (205) also has a secondary sales market, new rules regarding the control of $NO_x$ emissions and mercury can result in residual materials (ammonia and carbon) present in the ash that would appear to make it significantly less marketable.

In the mixing device, the combination of chloride purge stream (109), fly ash (203), and the fixation agent (301) are combined. When thoroughly mixed, the presence of silica and alumina, and to a lesser degree iron, in the fly ash (203) along with the fixation agent (301) will cause cementious and pozzolanic reactions to occur that bind the water and its related contaminants in a cement like matrix. Gypsum may be added in an embodiment, but will often be unnecessary.

After sufficient mixing has been performed, the composition (501) is removed from the mixing device and allowed to partially set up. This creates a material that is preferably very soil like in nature. After a relatively short period of time (generally no longer than 2-3 days), the material is removed from a pad for transport and final placement, such as landfilling (503). The material may also be placed under pressure (such as in the landfill (503)) to further modify its chemical structure and convert the soil like form to a more monolithic solid.

It should be recognized that depending on availability of markets, and the structure of the by-product (501) in some embodiments, the by-product may be useable as a building or construction material due to its relatively low leachable nature and strong load bearing capacity.

The relative percentages of the various materials placed in the mixing device (111) will generally depend on the specific compositions of the fly ash (203), synthetic gypsum (401) and chloride purge water (109) which are used, as well as relative availabilities of these materials based on secondary markets and types of coal used in the plant.

In some embodiments, the fly ash (203) will comprise at least 40% of the mixture, at least 65% of the mixture, at least 70% of the mixture, at least 80% of the mixture, or 40% to 80% of the mixture. Similarly, the FGD purge water (109) may comprise at least 15%, at least 20%, or at least 25%, or 15% to 25% of the mixture. FGD purge water (109) percentage may or may not take into account that the FGD purge water (109) may include concentrated solids (as discussed above) compared to FGD purge water formed immediately following gypsum removal (103). Thus, the solids in the FGD purge water (109) may comprise any percentage of the total mass of the mixture.

Gypsum (401), if used at all, will generally comprise no more than 40% of the mixture, no more than 35% of the mixture, no more than 30% of the mixture, no more than 20% of the mixture, no more than 10% of the mixture, no more than 5% of the mixture, no more than 1% of the mixture or may not be included at all. The fixation agent (301) will generally comprise no more than 5% of the mixture and generally 1%-5% of the mixture.

While the above provides general ranges, in an embodiment, the mixture comprises 1% to 5% lime (301), 40%-80% fly ash (203), 15%-25% purge water (109), and less than 40% gypsum (401) by mass. The mixture, in an embodiment, will comprise a material of soil-like physical structure having essentially no removable water. In an embodiment, the material will be compressible into a more monolithic solid form. All percentages used herein are generally by mass.

While the invention has been disclosed in conjunction with a description of certain embodiments, including those that are currently believed to be the preferred embodiments, the detailed description is intended to be illustrative and should not be understood to limit the scope of the present disclosure.

As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for capturing pollutants from the combustion of coal in a solid non-leachable form, the method comprising:
   using a calcium slurry to perform flue gas desulfurization (FGD) on flue gas created from the combustion of coal;
   performing a chloride purge on said calcium slurry to create an FGD purge stream;
   dewatering said FGD purge stream to separate gypsum from a purge water;
   mixing said purge water with fly ash and lime to create a low strength cement;
   allowing said low strength cement to harden; and
   landfilling said low-strength cement.

2. The method of claim 1, wherein said mixing also includes adding gypsum to said purge water, fly ash, and lime.

3. The method of claim 2, wherein said gypsum added to said water, fly ash, and lime comprises a portion of the gypsum separated in said dewatering.

4. The method of claim 2 wherein:
   said lime comprises about 1% to about 5% of said low strength cement by mass;
   said fly ash comprises about 40% to about 80% of said low strength cement by mass;
   said purge water comprises about 15% to about 25% of said low strength cement by mass; and
   said gypsum comprises less than 40% of said low strength cement by mass.

5. The method of claim 1 wherein:
   said lime comprises about 1% to about 5% of said low strength cement by mass;
   said fly ash comprises about 40% to about 80% of said low strength cement by mass; and
   said purge water comprises about 15% to about 25% of said low strength cement by mass.

\* \* \* \* \*